United States Patent
Yamana et al.

(12) 
(10) Patent No.: US 6,197,915 B1
(45) Date of Patent: Mar. 6, 2001

(54) THERMOPLASTIC POLYURETHANES, POLYURETHANE ELASTIC FIBERS THEREFROM, AND METHOD FOR PRODUCING THE FIBERS

(75) Inventors: Yoshihiro Yamana; Hiroyuki Ono, both of Okayama-ken (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/338,432

(22) Filed: Jun. 23, 1999

(30) Foreign Application Priority Data

Jul. 6, 1998 (JP) .................................................. 10-190228

(51) Int. Cl.$^7$ ............................. C08G 18/42; C08G 18/48
(52) U.S. Cl. ........................... 528/76; 264/176.1; 528/59; 528/61; 528/64; 528/80; 528/906
(58) Field of Search ........................... 264/176.1; 528/59, 528/61, 64, 76, 80, 906

(56) References Cited

U.S. PATENT DOCUMENTS

| | | | |
|---|---|---|---|
| 4,182,898 | * 1/1980 | Fujiwara et al. | 560/26 |
| 4,791,187 | * 12/1988 | Suling et al. | 528/63 |
| 5,565,270 | 10/1996 | Rehbold et al. | 428/364 |
| 5,780,573 | * 7/1998 | Iwata et al. | 528/272 |
| 5,840,233 | * 11/1998 | Foss | 264/176.1 |
| 5,912,193 | * 6/1999 | Iwata et al. | 442/102 |

FOREIGN PATENT DOCUMENTS

| | | |
|---|---|---|
| 0 397 121 A2 | 11/1990 | (EP) . |
| 0 679 738 A1 | 11/1995 | (EP) . |
| 0 748 829 A1 | 12/1996 | (EP) . |
| WO 96/25539 | 8/1996 | (WO) . |

OTHER PUBLICATIONS

Derwent Abstracts, Accession No. 1984–291366, JP 59 179513 A, Oct. 12, 1984.

* cited by examiner

Primary Examiner—Rabon Sergent
(74) Attorney, Agent, or Firm—Oblon, Spivak, McClelland, Maier & Neustadt, P.C.

(57) ABSTRACT

The invention relates to thermoplastic polyurethanes obtainable by reacting a polyol composition (A) which consists essentially of a polyester-polyol (A-1) having a crystallization enthalpy of at most 70 J/g and a number-average molecular weight of from 1000 to 5000 and a polyether-polyol (A-2) having a number-average molecular weight of from 500 to 2500, and in which the average number, f, of the functional hydroxyl groups existing therein falls between 2.006 and 2.100, an organic diisocyanate (B), and a chain extender (C), at a ratio that satisfies the following formula:

$$1.00 \leq b/(a+c) \leq 1.10$$

wherein a indicates the number of moles of all polyols constituting the polyol composition (A), b indicates the number of moles of the organic diisocyanate (B), and c indicates the number of moles of the chain extender (C); to elastic fibers comprising them; and to a method for producing polyurethane elastic fibers by melt-spinning the thermoplastic polyurethane. The thermoplastic polyurethanes and the polyurethane elastic fibers comprising them have good properties of spinning stability, heat resistance, hot water resistance, elastic recovery, elongation and homogeneousness of fiber.

4 Claims, No Drawings

THERMOPLASTIC POLYURETHANES, POLYURETHANE ELASTIC FIBERS THEREFROM, AND METHOD FOR PRODUCING THE FIBERS

BACKGROUND OF THE INVENTION

1. Field of the Invention:

The present invention relates to thermoplastic polyurethanes, polyurethane elastic fibers therefrom, and a method for producing the fibers. The thermoplastic polyurethanes of the invention give polyurethane fibers having good heat resistance, good hot water resistance and good elastic recovery.

2. Description of the Prior Art:

For producing polyurethane elastic fibers, known are methods of dry spinning, wetspinning, melt spinning, etc. Of those, polyurethane elastic fibers as obtained according to a melt-spinning method have good thermosettability, abrasion resistance and transparency, and, in addition, the production costs for them are low. Therefore, the consumption thereof is much increasing in recent days. However, as compared with polyurethane fibers as obtained according to a dry-spinning method, those as obtained according to a melt-spinning method are difficult to form stiff hard segments, and, therefore, their heat resistance and hot water resistance are not satisfactory.

For these reasons, heretofore, various methods have been proposed for improving the heat resistance and the hot water resistance of melt-spun, polyurethane elastic fibers. One conventional method comprises forming an intermolecular crosslinked structure of polyurethanes that constitute fibers. For example, JP-A-48-58095, JP-B-50-10630 and JP-A-6-294012 disclose a technique of forming a crosslinked structure in the hard segment parts of polyurethanes by the use of a trifunctional or higher polyfunctional chain extender such as trimethylolpropane. However, the heat resistance of the conventional polyurethanes having such a crosslinked structure as formed in the hard segment parts is not still satisfactory, and, therefore, the heat resistance of the polyurethane elastic fibers to be obtained from them is not also satisfactory.

Apart from the conventional method noted above, another method has been proposed for obtaining polyurethane elastic fibers having reduced residual strain and increased dynamic resiliency, which comprises preparing a polyurethane by reacting a hydroxy-polyester (this is prepared by reacting a glycol having a secondary hydroxyl group and a trifunctional or higher polyalcohol with a dicarboxylic acid) and a chain extender with an organic diisocyanate, followed by melt-spinning the resulting polyurethane into polyurethane elastic fibers (see JP-B-42-3958). However, the heat resistance of the polyurethane elastic fibers as obtained according to this method is still poor, and the method can not attain the object of obtaining polyurethane elastic fibers having good heat resistance. In addition, having actually produced polyurethanes and polyurethane elastic fibers according to the method of the examples described in JP-B-42-3958, we, the present inventors have found that the fibers are inferior in not only the heat resistance but also the hot water resistance and other properties.

JP-B-42-5251 has proposed a method for producing polyurethane elastic fibers, which comprises preparing a polyurethane from a polyol having more than two functional hydroxyl groups followed by spinning it in a wet chemical spinning manner. However, the wet chemical spinning in the proposed method often gives fibers that are poorly homogeneous and have poor abrasion resistance. On the other hand, in JP-A-59-179513 and 63-159519, it is disclosed that polyurethanes as produced from prepolymers comprising soft segments from a mixture of a polyester-diol and a polyether-diol have good solution stability during their spinning. However, the heat resistance and the hot water resistance of the polyurethanes disclosed therein are not satisfactory.

Given that situation, JP-A-3-220311 discloses polyurethanes as produced from a polyester-diol (this is prepared through reaction of a diol containing 3-methyl-1,5-pentanediol, and an aliphatic dicarboxylic acid component having from 6 to 12 carbon atoms), an organic diisocyanate and a chain extender, and fibers from the resulting polyurethanes. They say that the polyurethane elastic fibers have good chlorine resistance, water-proofness, fungus-proofness, elastic recovery, heat resistance, hot water resistance and elongation. Further, JP-A-9-49120 discloses polyurethane elastic fibers as produced from polyurethanes which are prepared from a polyester-polyol, an organic diisocyanate and a chain extender. They say that, when the composition of the starting component, polyester-polyol for the polyurethanes is specifically defined, the uniformity of the polyurethane fibers could be improved while the fibers preserve their good properties such as those mentioned above. The heat resistance and the hot water resistance of those polyurethane elastic fibers could be improved in some degree. However, it is still desired to further improve the properties of polyurethane elastic fibers.

SUMMARY OF THE INVENTION

One object of the invention is to provide thermoplastic polyurethanes having good properties of elastic recovery and elongation, and especially having good heat resistance and good hot water resistance, to provide polyurethane elastic fibers comprising them, and to provide a method for producing the fibers.

Specifically, the invention provides thermoplastic polyurethanes obtainable by reacting;

[1] a polyol composition (A) which consists essentially of a polyester-polyol (A-1) having a crystallization enthalpy of at most 70 J/g and a number-average molecular weight of from 1000 to 5000 and a polyether-polyol (A-2) having a number-average molecular weight of from 500 to 2500, and in which the average number, f, of the functional hydroxyl groups existing therein and represented by the following formula (I):

$$f = \{\text{number of all hydroxyl groups in the polyols constituting the polyol composition}\}/\{\text{number of molecules of all polyols constituting the polyol composition}\} \qquad (I),$$

falls between 2.006 and 2.100,

[2] an organic diisocyanate (B), and

[3] a chain extender (C), at a ratio that satisfies the following formula (II):

$$1.00 \leq b/(a+c) \leq 1.10 \qquad (II)$$

wherein a indicates the number of moles of all polyols constituting the polyol composition (A), b indicates the number of moles of the organic diisocyanate (B), and c indicates the number of moles of the chain extender (C).

The invention also provides polyurethane elastic fibers comprising the thermoplastic polyurethane noted above.

The invention further provides a method for producing polyurethane elastic fibers, which comprises melt-spinning the thermoplastic polyurethane noted above, or comprises melt-spinning the thermoplastic polyurethane while forming it by reacting (A), (B) and (C) in the predetermined ratio as above.

The thermoplastic polyurethanes and the polyurethane elastic fibers comprising them of the invention have various good properties of spinning stability, heat resistance, hot water resistance, elastic recovery, elongation and homogeneousness, and therefore have many applications in various fields owing to such their excellent characteristics. According to the production method of the invention, polyurethane elastic fibers of high quality having various excellent characteristics such as those mentioned above can be produced smoothly and in favorable process characteristics from the thermoplastic polyurethanes of the invention. Specifically, in the method, the thermoplastic polyurethanes can be stably spun, while suppressing increase in the pressure in the spinning pack.

DETAILED DESCRIPTION OF THE INVENTION

The invention is described in detail hereunder.

The thermoplastic polyurethanes of the invention are obtained by reacting a polyol composition (A) that consists essentially of the polyester-polyol (A-1) and the polyether-polyol (A-2) noted above, an organic diisocyanate (B) and a chain extender (C), at a ratio that satisfies the following formula (II):

$$1.00 \leq b/(a+c) \leq 1.10 \quad \text{(II)}$$

wherein a indicates the number of moles of all polyols constituting the polyol composition (A), b indicates the number of moles of the organic diisocyanate (B), and c indicates the number of moles of the chain extender (C). If the ratio of b/(a+c) is smaller than 1.00, the thermoplastic polyurethanes to be produced will have a low molecular weight, and, therefore, the polyurethane elastic fibers from them could not have good heat resistance and good hot water resistance. On the other hand, if the ratio of b/(a+c) is larger than 1.10, the spinning stability in producing the polyurethane elastic fibers will be poor, and, therefore, the polyurethane elastic fibers produced could not be homogeneous. It is desirable that the ratio of b/(a+c) falls between 1.00 and 1.07 for further improving the spinning stability, the heat resistance and the hot water resistance of the thermoplastic polyurethanes and the polyurethane elastic fibers from them.

The polyester-polyol (A-1) constituting the thermoplastic polyurethanes of the invention has a number-average molecular weight of from 1000 to 5000. If the number-average molecular weight of the polyester-polyol (A-1) is smaller than 1000, the thermoplastic polyurethanes to be obtained and the polyurethane elastic fibers from them could not have good heat resistance and good hot water resistance. On the other hand, if the number-average molecular weight of the polyester-polyol (A-1) is larger than 5000, the spinning stability in producing the polyurethane elastic fibers will be poor, and, therefore, the polyurethane elastic fibers produced could not be homogeneous. Preferably, the number-average molecular weight of the polyester-polyol (A-1) falls between 1500 and 3500. The number-average molecular weight of the polyester-polyol (A-1) and that of the polyether-polyol (A-2) which will be described in detail hereunder are both calculated on the basis of the hydroxyl value of those polymers as measured according to JIS K-1577.

The crystallization enthalpy (ΔH) of thepolyester-polyol (A-1) that constitutes the thermoplastic polyurethanes of the invention is at most 70 J/g. If the crystallization enthalpy (ΔH) of the polyester-polyol (A-1) is larger than 70 J/g, the degree of elongation and the elastic recovery of the thermoplastic polyurethanes obtained and the polyurethane elastic fibers from them will lower to a great extent. The crystallization enthalpy (ΔH) in this invention is preferably not lower than 0 J/g. The crystallization enthalpy (ΔH) of the polyester-polyol (A-1) as referred to herein can be measured with a differential scanning calorimeter. Concretely, it indicates the data as measured in accordance with the method illustrated in the examples to be mentioned hereunder.

The number-average molecular weight of the polyether-polyol (A-2) constituting the thermoplastic polyurethanes of the invention falls between 500 and 2500. If the number-average molecular weight of the polyether-polyol (A-2) is smaller than 500, the thermoplastic polyurethanes to be obtained and the polyurethane elastic fibers from them could not have good heat resistance and good hot water resistance. On the other hand, if the number-average molecular weight of the polyether-polyol (A-2) is larger than 2500, not only the polymerization reaction to produce the thermoplastic polyurethanes will be difficult but also the spinning stability in producing the polyurethane elastic fibers will be poor, and, therefore, the polyurethane elastic fibers produced could not be homogeneous. Preferably, the number-average molecular weight of the polyether-polyol (A-2) falls between 700 and 2300.

The polyol composition (A) constituting the thermoplastic polyurethanes of the invention consists essentially of the polyester-polyol (A-1) and the polyether-polyol (A-2). It is desirable that the proportion of those components (A-1) and (A-2) to (A) is at least 80 mole %, more preferably at least 90 mole %, based on the number of moles of all polyols constituting the polyol composition (A), in view of the heat resistance and the hot water resistance of the thermoplastic polyurethanes obtained and those of the polyurethane elastic fibers from them.

The molar ratio of the polyester-polyol (A-1) to the polyether-polyol (A-2), (A-1)/(A-2), preferably falls between 5/95 and 95/5, more preferably between 10/90 and 90/10. If the molar ratio is smaller than 5/95, the spinning stability in producing the polyurethane elastic fibers will be poor, and, in addition, the degree of elongation of the fibers will be low. On the other hand, if the molar ratio is larger than 95/5, the thermoplastic polyurethanes obtained and the polyurethane elastic fibers from them could hardly have good heat resistance and good hot water resistance.

The polyol composition (A) constituting the thermoplastic polyurethanes of the invention is so defined that the average number, f, of the functional hydroxyl groups existing therein falls between 2.006 and 2.100. The average number, f, is represented by the following formula (I):

f={number of all hydroxyl groups in the polyols constituting the polyol composition}/{number of molecules of all polyols constituting the polyol composition}    (I).

As is obvious from the formula (I), the average number, f, of the functional hydroxyl groups in (A) indicates the average number of the hydroxyl groups per one polyol molecule in the polyol composition (A).

If the average number, f, of the functional hydroxyl groups in the polyol composition (A) is smaller than 2.006, the molecular weight of the thermoplastic polyurethanes obtained could not be high, and, therefore, not only the thermoplastic polyurethanes and the polyurethane elastic fibers from them could hardly have good heat resistance and good hot water resistance but also the spinning stability in producing the polyurethane elastic fibers will be poor. As a result, the polyurethane elastic fibers produced could not be homogeneous. This tendency increases with an increase in the ratio of the polyether-polyol (A-2) to the polyester-polyol (A-1).

On the other hand, if the average number, f, of the functional hydroxyl groups in (A) is larger than 2.100, the heat resistance and the hot water resistance of the thermoplastic polyurethanes obtained will be poor. If so, in addition, the spinning temperature for the thermoplastic polyurethanes must be high. However, the thermoplastic polyurethanes being spun at high temperatures will be pyrolyzed to give thermally degraded products, and their spinning stability is thereby worsened.

Preferably, the average number of the functional hydroxyl groups in the polyol composition (A) falls between 2.010 and 2.080 in view of the heat resistance and the hot water resistance of the thermoplastic polyurethanes obtained.

The polyester-polyol (A-1) for use in the invention is prepared by reacting a dicarboxylic acid component with a polyalcohol component that comprises a diol and at need a small amount of a trifunctional or higher polyfunctional alcohol. The ratio of the dicarboxylic acid component to the polyalcohol component in the polycondensation to give the polyester-polyol (A-1) must be so defined that the average number, f, of the functional hydroxyl groups to be in the polyol composition (A) containing a predetermined amount of the polyester-polyol (A-1) falls within the defined range of from 2.006 to 2.100 and that the polyester-polyol (A-1) has a number-average molecular weight of from 1000 to 5000.

In order that the polyester-polyol (A-1) as obtained-through the polycondensation may have a crystallization enthalpy, $\Delta H$, of at most 70 J/g, as so defined hereinabove, it is preferable that a part or the whole of the dicarboxylic acid component is a branched, acyclic dicarboxylic acid and/or a part or the whole of the polyalcohol component is a branched, acyclic primary diol. Regarding the proportion of the branched, acyclic dicarboxylic acid and/or the branched, acyclic primary diol in that preferred case, it is desirable that the number of moles of both the branched, acyclic dicarboxylic acid and the branched, acyclic primary diol is at least 10 mole %, more preferably at least 30 mole %, even more preferably at least 50 mole % and not more than 100 mole %, based on the number of moles of all the dicarboxylic acid component and the polyalcohol component to be used for the formation of the polyester-polyol (A-1).

If the number of moles of both the branched, acyclic dicarboxylic acid and the branched, acyclic primary diol is smaller than 10 mole % based on the number of moles of all the dicarboxylic acid component and the polyalcohol component used for the formation of the polyester-polyol (A-1), it will be difficult to make the polyester-polyol (A-1) have a crystallization enthalpy, $\Delta H$, of not larger than 70 J/g, and, as a result, the crystallization enthalpy, $\Delta H$, of the polyester-polyol (A-1) will depart from the range defined in the invention. It will bring about poor results in not only the elongation and the elastic recovery but also the heat resistance and the hot water resistance of the thermoplastic polyurethanes that comprise the polyester-polyol, of which the crystallization enthalpy departs from the defined range, and even those of the polyurethane elastic fibers from them. So far as the number of moles of both the branched, acyclic dicarboxylic acid and the branched, acyclic primary diol is at least 10 mole %, based on the number of moles of all the dicarboxylic acid component and the polyalcohol component, the polyester-polyol (A-1) obtained is satisfactory for use in the invention in any case where only the dicarboxylic acid component for production of the polyester-polyol (A-1) contains the branched, acyclic dicarboxylic acid but the polyalcohol component does not contain the branched, acyclic primary diol, or where only the polyalcohol component contains the branched, acyclic primary diol but the dicarboxylic acid component does not contain the branched, acyclic dicarboxylic acid, or where the dicarboxylic acid component contains the branched, acyclic dicarboxylic acid and the polyalcohol component contains the branched, acyclic primary diol.

As the branched, acyclic dicarboxylic acid that is preferably used for producing the polyester-polyol (A-1), preferred are those having a branched, saturated aliphatic hydrocarbon chain or a branched, unsaturated aliphatic hydrocarbon chain with a carboxyl group at both the ends of the chain and having from 5 to 14 carbon atoms, and their ester derivatives. Preferred examples of the branched, acyclic dicarboxylic acid of that type include 2-methylsuccinic acid, 3-methylglutaric acid, 2-methyladipic acid, 3-methyladipic acid, 3-methylpentane-diacid, 2-methyloctane-diacid, 3,7-dimethylsebacic acid, 3,8-dimethylsebacic acid, and their ester derivatives. One or more of these branched, acyclic dicarboxylic acids may be used either singly or in combination.

In producing the polyester-polyol (A-1), any other dicarboxylic acids of linear dicarboxylic acids and cyclic dicarboxylic acids may be used at need along with the branched, acyclic dicarboxylic acids mentioned above. Examples of the dicarboxylic acids include linear dicarboxylic acids such as succinic acid, glutaric acid, adipic acid, pimelic acid, suberic acid, azelaic acid, sebacic acid, dodecane-diacid, etc.; aromatic dicarboxylic acids such as phthalic acid, isophthalic acid, terephthalic acid, naphthalenedicarboxylic acid, tetrabromophthalic acid, etc.; alicyclic dicarboxylic acids such as cyclohexanedicarboxylic acid, etc.; and their ester derivatives. One or more of these additional dicarboxylic acids may be used either singly or in combination. So far as the polyester-polyol (A-1) satisfies the requirements of the invention, a small amount of trifunctional or higher polyfunctional carboxylic acids such as trimellitic acid, pyromellitic acid and the like or their ester derivatives may be optionally used in producing it.

As the branched, acyclic primary diol that is preferably used for producing the polyester-polyol (A-1), preferred are those having a branched, saturated aliphatic hydrocarbon chain or a branched, unsaturated aliphatic hydrocarbon chain with a hydroxyl group at both the ends of the chain and having from 4 to 10 carbon atoms. Preferred examples of the branched, acyclic primary diol of that type include 2-methyl-1,3-propanediol, 2,2-diethyl-1,3-propanediol, 2-methyl-1,4-butanediol, neopentyl glycol, 3-methyl-1,5-pentanediol, 2-methyl-1,8-octanediol, 2,7-dimethyl-1,8-octanediol, etc. Of those, especially preferred are 3-methyl-1,5-pentanediol and 2-methyl-1,8-octanediol, as they further improve the heat resistance and the hot water resistance of the thermoplastic polyurethanes comprising the diol and the polyurethane elastic fibers from them. One or more of these branched, acyclic primary diols may be used either singly or in combination.

In producing the polyester-polyol (A-1), any other diols of linear diols and cyclic diols may be used at need along with the branched, acyclic primary diols mentioned above. Examples of the such diols include linear diols such as ethylene glycol, diethylene glycol, triethylene glycol, propylene glycol, 1,3-propanediol, 1,4-butanediol, 1,5-pentanediol, 1,6-hexanediol, 1,7-heptanediol, 1,8- octanediol, 1,9-nonanediol, 1,10-decanediol, etc.; and alicyclic diols such as 1,4-cyclohexanedimethanol, etc. One or more these additional diols may be used either singly or in combination.

In producing the polyester-polyol (A-1), a small amount of a trifuctional or higher polyfunctional alcohol is preferably used along with the diol mentioned above, as so noted hereinabove, in order that the average number, f, of the functional hydroxyl groups existing in the polyol composition (A), which comprises the polyester-polyol (A-1) and the polyether-polyol (A-2) in a predetermined ratio, may fall within the range between 2.006 and 2.100 as so defined herein. Examples of the trifunctional or higher polyfunctional alcohol to be used along with the diol include glycerin, trimethylolpropane, trimethylolbutane, trimethylolpentane, hexanetriol, pentaerythritol, diglycerin, etc. One or more of these additional alcohols may be used either singly or in combination. Of the additional alcohols, more preferred are glycerin and trimethylolpropane.

In producing the polyester-polyol (A-1), the reaction of the dicarboxylic acid component and the polyalcohol component including diols and trifunctional or higher polyfunctional alcohols must be so controlled for their amounts that the average number of the functional hydroxyl groups to be in the resulting polyester-polyol (A-1) could fall within a predetermined range.

The polyester-polyol (A-1) to be used for producing the thermoplastic polyurethanes of the invention may be either a single polyester-polyol or a mixture of two or more polyester-polyols. At any rate, the polyester-polyol (A-1), being either a single polyester-polyol or a mixture of two or more polyester-polyols with no specific limitation, shall satisfy the requirements of the invention.

The method for producing the polyester-polyol (A-1) for use in the invention is not specifically defined. For example, it may be produced through any known polycondensation that comprises esterification or ester interchanging reaction of a dicarboxylic acid component, a diol, a trifuntional or higher polyfunctional alcohol and at need a trifunctional or higher polyfunctional carboxylic acid component, such as those mentioned hereinabove.

The polycondensation to produce the polyester-polyol (A-1) can be conducted in the presence of a catalyst. The preferable catalyst are titanium catalysts and tin catalysts. Examples of usable titanium catalysts include titanic acid, tetraalkoxy titanium compounds, titanium acylate compounds, titanium chelate compounds, etc. More concretely mentioned are tetraalkoxy titanium compounds such as tetraisopropyl titanate, tetra-n-butyl titanate, tetra-2-ethylhexyl titanate, tetrastearyl titanate, etc.; titanium acylate compounds such as polyhydroxytitanium stearate, polyisopropoxytitanium stearate, etc.; titanium chelate compounds such as titanium acetylacetate, triethanolamine titanate, titanium ammonium lactate, titanium ethyl lactate, etc. Examples of usable tin catalysts include dialkyl tin diacetates, dialkyl tin dilaurates, dialkyl tin bismercaptocarboxylate, etc. More concretely mentioned are dibutyl tin diacetate, dibutyl tin dilaurate, dibutyl tin bis (ethoxybutyl 3-mercaptopropionate), etc.

The amount of the titanium catalyst, if used, is not specifically defined but can be varied depending on the reaction condition. In general, however, it is preferably approximately from 0.1 to 50 ppm, more preferably approximately from 1 to 30 ppm, based on the total weight of the reactants that are used for producing the intended polyester-polyol. The amount of the tin catalyst, if used, is not also specifically defined but can be varied depending on the reaction condition. In general, however, it is preferably approximately from 1 to 200 ppm, more preferably approximately from 5 to 100 ppm, based on the total weight of the reactants that are used for producing the intended polyester-polyol.

Where polyester-polyols are produced in the presence of a titanium catalyst, it is desirable that the titanium catalyst remaining in the polyester-polyols produced is deactivated. If polyester-polyols containing some non-deactivated titanium catalyst are used to produce thermoplastic polyurethanes, the characteristics, such as heat resistance and hot water resistance, of the thermoplastic polyurethanes produced and the polyurethane elastic fibers from them are often poor.

To deactivate the titanium catalyst remaining in polyester-polyols, for example, employable are (1) a method of bringing the polyester-polyols into contact with water under heating, and (2) a method of treating the polyester-polyols with phosphorus compounds such as phosphoric acid, phosphates, phosphorous acid, phosphites, etc. In the method (1) where the titanium catalyst is deactivated through contact with water, for example, at least 1% by weight of water may be added to the polyester-polyols and heated at from 70 to 150° C., preferably at from 90 to 130° C. for from 1 to 3 hours or so. The deactivation of the titanium catalyst under heating can be effected at atmospheric pressure or under reduced pressure. After the deactivation treatment, the pressure in the system may be reduced whereby water as added to the system for the deactivation can be smoothly removed from the polyester-polyols.

The polyether-polyol (A-2) for use in the invention may be prepared through ring-opening polymerization of a cyclic ether in the presence of a diol and at need a small amount of a trifunctional or higher polyfunctional alcohol component. Thediol and the trifunctional or higher polyfunctional alcohol component to be used for the ring-opening polymerization of the cyclic ether must be so controlled for their amounts that the average number, f, of the functional hydroxyl groups to be in the polyol composition (A), which comprises a predetermined amount of the polyether-polyol (A-2), falls within the defined range of from 2.006 to 2.100, and that the number-average molecular weight of the polyether-polyol (A-2) falls within the defined range of from 500 to 2500.

Examples of the polyether-polyol (A-2) for use in the invention include polyethylene glycol, polypropylene glycol, polytetramethylene glycol, poly (methyltetramethyleneglycol), etc. One of those, or amixture of two or more of them may be used in the invention. Examples of the component, trifunctional or higher polyfunctional alcohol that may be used at need for producing the polyether-polyol include glycerin, trimethylolpropane, trimethylolbutane, trimethylolpentane, hexanetriol, pentaerythritol, diglycerin, etc. One or more those alcohols may be used either singly or in combination.

The polyol composition (A) for use in the invention may contain at need, in addition to the polyester-polyol (A-1) and the polyether-polyol (A-2), any other polyols except them. Such polyols include, for example, polycarbonate-polyols, polyester-polycarbonate-polyols, etc. It is desirable that the amount of said polyol to be in the polyol composition (A) is at most 20 mol % based on the number of moles of all polyols constituting the composition (A).

The organic diisocyanate (B) to be used for producing the thermoplastic polyurethanes of the invention is not specifically defined but may be any and every organic diisocyanate that is generally used for producing ordinary thermoplastic polyurethanes. Examples thereof include aromatic diisocyanates such as 4,4'-diphenylmethane diisocyanate, tolylene diisocyanate, phenylene diisocyanate, xylylene diisocyanate, 1,5-naphthylene diisocyanate, 3,3'-dichloro-4,4'-diphenylmethane diisocyanate, etc.; aliphatic or alicyclic diisocyanates such as hexamethylene diisocyanate, isophorone diisocyanate, 4,4'-dicyclohexylmethane diisocyanate, hydrogenated xylylene diisocyanate, etc. One or more of these organic diisocyanates can be used either singly or in combination. Of those, preferred is 4,4'-diphenylmethane diisocyanate. If desired, a small amount of a trifunctional or higher polyfunctional polyisocyanate compound, such as triphenylmethane triisocyanate or the like, may be added to the diisocyanate (B).

The chain extender (C) to be used in producing the thermoplastic polyurethanes of the invention is not specifically defined but may be any and every one that is generally used in producing ordinary thermoplastic polyurethanes. Preferred are low-molecular compounds having a molecular weight of at most 300 and having, in the molecule, at least two active hydrogen atoms capable of reacting with isocyanate groups. Examples of the low-molecular compounds include diols such as ethylene glycol, propylene glycol, 1,4-butanediol, 1,6-hexanediol, 1,4-bis(β-hydroxyethoxy) benzene, 1,4-cyclohexanedimethanol, bis(β-hydroxyethyl) terephthalate, xylylene glycol, etc.; diamines such as hydrazine, ethylenediamine, propylenediamine, xylylenediamine, isophoronediamine, piperazine and its derivatives, phenylenediamine, tolylenediamine, xylylenediamine, adipic acid dihydrazide, isophthalic acid dihydrazide, etc.; amino alcohols such as aminoethyl alcohol, aminopropyl alcohol, etc. One or more of those chain extender may be used either singly or in combination. Of those, preferred are aliphatic diols having from 2 to 10 carbon atoms, and more preferred is 1,4-butanediol as it further improves the heat resistance and the hot water resistance of thermoplastic polyurethanes and thermoplastic elastic fibers from them.

The method for producing thermoplastic polyurethanes in the invention is not specifically defined. The thermoplastic polyurethanes of the invention are produced from the polyester-polyol (A-1), the polyether-polyol (A-2), the organic diisocyanate (B), the chain extender (C) and at need other components such as those noted above, for which any and every known method is employable. For example, employable are a prepolymer method, a one-shot method and others based on known techniques of polyurethanation including melt polymerization, solution polymerization, etc. Above all, preferred is melt polymerization under substantially solventless conditions to give thermoplastic polyurethanes, as being simple and efficient. More preferred is continuous melt polymerization using a multi-screw extruder, because of its high producibility. The polyurethanation to produce the thermoplastic polyurethanes of the invention can be conducted in the presence of urethanating tin catalysts. It is desirable to conduct the polyurethanation in the presence of an urethanating tin catalyst in an amount of from 0.5 to 10 ppm, in terms of the tin atom, based on the total weight of the raw materials used, as it can produce thermoplastic polyurethanes having a high molecular weight. Where such high-molecular thermoplastic polyurethanes are formed into thermoplastic elastic fibers, the spinnability and the windability of the fibers are good while the adhesion of the fibers to each other during spinning and winding is reduced. In addition, such high-molecular thermoplastic polyurethanes can be formed into polyurethane elastic fibers with good mechanical properties including heat resistance, etc. Examples of the urethanating tin catalyst include dibutyltin diacetate, dibutyltin dilaurate, dibutyltin bis(ethoxybutyl 3-mercaptopropionate), etc.

During or after polymerization to give the thermoplastic polyurethanes of the invention, as required, it is possible to add thereto various additives that are generally used in the production of ordinary thermoplastic polyurethanes, such as thermal stabilizers, antioxidants, ultraviolet absorbents, flame retardants, lubricants, colorants, hydrolysis inhibitors, nucleating agents, weather resistance improving agents, antifungal agents, etc.

The polyurethane elastic fibers of the invention can be produced by melt-spinning the thermoplastic polyurethanes of the invention. To produce the polyurethane elastic fibers through melt-spinning, for example, employable are the following methods:

[i] A method of previously preparing thermoplastic polyurethanes by reacting;

[1] a polyol composition (A) which consists essentially of a polyester-polyol (A-1) having a crystallization enthalpy of at most 70 J/g and a number-average molecular weight of from 1000 to 5000 and a polyether-polyol (A-2) having a number-average molecular weight of from 500 to 2500, and in which the average number, f, of the functional hydroxyl groups existing therein and represented by the following formula (I):

f={number of all hydroxyl groups in the polyols constituting the polyol composition}/{number of molecules of all polyols constituting the polyol composition}   (I), falls between 2.006 and 2.100,

[2] an organic diisocyanate (B), and

[3] a chain extender (C), at a ratio that satisfies the following formula (II):

$$1.00 \leq b/(a+c) \leq 1.10 \quad (II)$$

where a indicates the number of moles of all polyols constituting the polyol composition (A), b indicates the number of moles of the organic diisocyanate (B), and c indicates the number of moles of the chain extender (C), followed by melt-spinning the resulting thermoplastic polyurethanes; and

[ii] a method of producing thermoplastic polyurethanes by melt-polymerizing the above-mentioned polyol composition (A), organic diisocyanate (B) and chain extender (C) at the ratio that satisfies the above-mentioned formula (II) while directly spinning the melt of the resulting thermoplastic polyurethane through spinnerets.

In consideration of the physical properties of the fibers to be obtained and of the easiness in the melt-spinning operation, the melt-spinning temperature is preferably not higher than 260° C., but more preferably falls between 220 and 250° C. After having been thus melt-spun, the polyurethane elastic fibers are preferably aged under heat at from 50° C. to 100° C. to further improve their performance. The kind and the type of the spinning device to be employed for the melt-spinning are not specifically defined, and any conventional melt-spinning device that is generally employed for producing polyurethane elastic fibers can be used herein.

The degree of polymerization of the thermoplastic polyurethanes that constitute the polyurethane elastic fibers of the invention is not specifically defined. However, in consideration of the heat resistance and the hot water resistance of the polyurethane elastic fibers, the degree of polymerization is preferably such that the polyurethane elastic fibers as dissolved in N,N-dimethylformamide containing 1% by weight of n-butylamine at a concentration of 0.5 dl/g can have a logarithmic viscosity at 30° C. of at least 0.5 dl/g, especially preferably at least 0.7 dl/g and the upper limit of the logarithmic viscosity is infinity.

In particular, it is especially preferable to produce the polyurethane elastic fibers of the invention from thermoplastic polyurethanes with a high degree of polymerization to such an extent that the resulting fibers do not dissolve at all or dissolve only partly in N,N-dimethylformamide containing 1% by weight of n-butylamine, since the polyurethane elastic fibers from the thermoplastic polyurethanes with such a high degree of polymerization can have much more excellent heat resistance and hot water resistance.

The fineness of the single fiber of the polyurethane elastic fibers of the invention is not specifically defined and may be determined suitably depending on the use of the fibers. In general, the fineness of the single fiber is preferably approximately from 10 to 100 deniers or so. The polyurethane elastic fibers of the invention may be either in the form of monofilaments or multifilaments. For the latter multifilaments, the number of the filaments and the number of the total deniers are not specifically defined but may be determined suitably. The cross-sectional profiles of the polyurethane elastic fibers of the invention are not also specifically defined but may be any of circular, square, hollow-shaped, triangular, oval, flattened multi-leafy, V-shaped, T-shaped, arrayed and other modified cross-sections. To produce various products using the polyurethane elastic fibers of the invention, the fibers maybe used singly or in combination with any other fibers in any desired modes.

The use of the polyurethane elastic fibers of the invention is not specifically defined and the fibers may be applied to various uses. Utilizing their elastic characteristics, the fibers can be used in sports goods such as swimming suits and trunks, outer wear, cycling wear, leotards, etc.; clothes such as lingerie, foundation garments, underwear, etc.; accessories such as panty hose, socks, supporters, hats, gloves, etc.; medical supplies such as bandages, artificial vessels, etc.; and also non-clothing products such as guts for tennis rackets, base yarns for car sheets to be molded through integrated molding, yarns for coating metals for robot arms, etc. Above all, the polyurethane elastic fibers of the invention are extremely effectively used in sports goods and clothes, making full use of the excellent characteristics of good heat resistance, hot water resistance, elongation, elastic recovery and homogeneousness.

The invention is described more concretely with reference to the following Examples, which, however, are not intended to restrict the scope of the invention. In the following Examples and Comparative Examples, the number-average molecular weight of polyols, the crystallization enthalpy ($\Delta H$) of polyester-polyols, the spinning stability in producing polyurethane elastic fibers, and the logarithmic viscosity, the heat resistance, the hot water resistance and the modulus of elastic recovery of polyurethane elastic fibers were measured and evaluated according to the methods mentioned below.

Number-Average Molecular Weight of Polyols

The number-average molecular weight of each polyol sample was calculated on the basis of its hydroxyl value as measured in accordance with JIS K1577.

Crystallization Enthalpy ($\Delta H$) of Polyester-polyols

Using a differential scanning calorimeter (Rigaku Thermal Analysis Station TAS10 Model, produced by Rigaku Denki Co.), the crystallization enthalpy ($\Delta H$) of each polyester-polyol sample was measured. The amount of the sample was about 10 mg. The quantity of heat of the sample was measured in a nitrogen gas atmosphere, according to the process mentioned below. From the peak area after the step 3, the crystallization enthalpy ($\Delta H$) of the sample was obtained.

Process for measuring crystallization enthalpy of polyester-polyols:

Step 1: The sample is heated from room temperature up to 100° C. at a heating rate of 100° C./min, and the heated sample is kept as such for 3 minutes.

Step 2: The sample is then cooled from 100° C. to −100° C. at a cooling rate of 10° C./min, and the cooled sample is kept as such for 1 minute.

Step 3: The sample is again heated from −10° C. up to 100° C. at a heating rate of 10° C./min.

Spinning Stability in Producing Polyurethane Elastic Fibers

Using a single-screw extruder, each polyurethane sample was spun continuously for one week at a spinning temperature of from 220° C. to 245° C. in the same manner as in the following Examples or Comparative Examples, whereupon the increase in the pressure in the spinning pack (sand mesh: #60 to #80) was measured with a pressure gauge. The stability of the sample during its spinning was evaluated on the basis of the following criteria:

Criteria for Evaluation of Spinning Stability:

◯: The continuous spinning was possible almost without increase in the pressure in the spinning pack (increase in pressure: at most 4 kg/cm$^2$).

Δ: The continuous spinning was difficult because of the increase in the pressure in the spinning pack (increase in pressure: from more than 4 to less than 8 kg/cm$^2$).

×: The continuous spinning was impossible because of the great increase in the pressure in the spinning pack (increase in pressure: 8 kg/cm$^2$ or more).

Logarithmic Viscosity of Polyurethane Elastic Fibers

A sample of polyurethane elastic fibers was dissolved in N,N-dimethylformamide containing 1% by weight of n-butylamide, at a concentration of 0.5 g/dl. Using an Ubbelohde's viscometer, the downflow time of the resulting polyurethane solution at 30° C. was measured, from which the logarithmic viscosity of the sample was calculated in accordance with the following equation:

$$\text{Logarithmic Viscosity} = [\ln(t/t_0)]/c$$

wherein t is the down flow time (second) of the polyurethane sample solution, $t_0$ is the down flow time (second) of the solvent, and c is the concentration of the polyurethane sample solution (g/dl).

Heat Resistance of Polyurethane Elastic Fibers

While being kept stretched by 200% in a wood frame, a sample of polyurethane elastic fibers was heated with a hot air oven at 140° C. for 1 minute. Based on the non-treated original sample, the strength retention of the heated sample at 300% stretching was obtained according to the following equation, and this indicates the heat resistance of the sample.

Strength Retention (%) at 300% Stretching=$(M/M_0) \times 100$ wherein M is the 300% modulus of the sample after the treatment, and $M_0$ is the 300% modulus of the sample before the treatment.

Hot Water Resistance of Polyurethane Elastic Fibers

The hot water resistance of polyurethane elastic fibers was evaluated in the same manner as in the evaluation of the heat resistance thereof, except that the sample was dipped in hot water at 100° C. in an autoclave for 30 minutes. The strength retention of the treated sample was obtained in the same manner as above, and it indicates the hot water resistance of the sample.

Degree of Elastic Recovery of Polyurethane elastic Fibers

A sample of polyurethane elastic fibers was left at room temperature for 2 minutes, while being stretched by 300%. After the tension was removed, the sample was left as it was for 2 minutes. The degree of its elastic recovery was calculated according to the following equation.

Degree of Elastic Recovery (%)={1-(L-$L_0$)/$L_0$}×100 wherein L is the length (mm) of the sample as left for 2 minutes after removal of the tension, and $L_0$ is the length (mm) of the non-stretched original sample.

Degree of Elongation of Polyurethane Elastic Fibers

The degree of elongation of polyurethane elastic fibers was obtained according to JIS K7311.

Homogeneousness of Polyurethane Elastic Fibers

A sample having a length of 50 m was collected from polyurethane elastic fibers obtained through melt-spinning. A thickness measuring device (Keisokuki Evenness Tester Model KEP-80C, produced by Keisokuki Kogyo Co.) was slid over the sample in its lengthwise direction to check for the unevenness, if any, in the thickness of the sample. The homogeneousness of the sample was evaluated in accordance with the following criteria.

Criteria for Evaluation of Homogeneousness of Resilient Polyurethane Fibers:

◯: The unevenness in the thickness of fibers was at most 1%.

Δ: The unevenness in the thickness of fibers was from more than 1% to less than 3%.

×: The unevenness in the thickness of fibers was 3% or more.

The abbreviations for the compounds used for producing the resins in the following Examples and Comparative Examples are mentioned below.

BD: 1,4-butanediol
MPD: 3-methyl-1,5-pentanediol
TMP: trimethylolpropane
AD: Adipic acid
Sb: Sebacic acid
MDI: 4,4-diphenylmethane diisocyanate
PTMG: polytetramethylene glycol

REFERENCE EXAMPLE 1

950 g of MPD, 117.4 g of TMP and 954 g of AD were put into a reactor, and esterified therein at atmospheric pressure at 200° C., while removing water produced from the container through distillation (to the outside of the reaction system). After the reaction product came to have an acid value of at most 30, 30 mg of a titanium catalyst, namely tetraisopropyl titanate was added thereto for polymerization, and the reaction was further continued while reducing the pressure in the reaction system to from 100 to 200 mmHg. After the reaction product came to have an acid value of 1.0, the vacuum degree in the container was gradually increased by the use of a vacuum pump, and the reaction was stopped. Next, the reaction system was cooled to 100° C., and 3% by weight of water was added thereto and heated for 2 hours while stirring, whereby the titanium catalyst was deactivated. Then, water was removed from the container through distillation under reduced pressure, and 10 ppm of dibutyltin diacetate was added as a tin catalyst for urethanation. In that manner comprising deactivation of the titanium catalyst followed by addition of the tin catalyst for urethanation, obtained was polyester-polyol A. The number-average molecular weight of the polyester-polyol, the average number of functional hydroxyl groups in the polyester-polyol, and the crystallization enthalpy (ΔH) of the polyester-polyol are shown in Table 1 below.

REFERENCE EXAMPLES 2 TO 9

The same procedure as in Reference Example 1 was repeated except that the polyol component and the dicarboxylic acid component shown in Table 1 below were used. Briefly, after the esterification, the titanium catalyst for polymerization was deactivated, and the tin catalyst for urethanation was added. Thus were obtained different polyester-polyols as in Table 1. The number-average molecular weight of the polyester-polyols, the average number of functional hydroxyl groups in the polyester-polyols, and the crystallization enthalpy (ΔH) of the polyester-polyols are shown in Table 1 below.

TABLE 1

| | | Composition of Polyester-Polol | | | Average Number of | Crystallization Enthalpy |
|---|---|---|---|---|---|---|
| | | Polyol Component (ratio by mole) | Dicarboxylic Acid Component | Number-Average Molecular Weight | Functional Hydroxyl Groups | (ΔH) [J/g] |
| Reference Example 1 | Polyester-Polyol A | MPD/TMP = (40.9) | AD | 800 | 2.100 | not detected |
| Reference Example 2 | Polyester-Polyol B | MPD/TMP = (96.1) | AD | 2000 | 2.100 | not detected |
| Reference Example 3 | Polyester-Polyol C | MPD/TMP = (165.2) | AD | 3500 | 2.100 | not detected |
| Reference Example 4 | Polyester-Polyol D | MPD/TMP = (280.3) | AD | 6000 | 2.100 | not detected |
| Reference Example 5 | Polyester-Polyol E | MPD (–) | AD | 2000 | 2.000 | not detected |
| Reference Example 6 | Polyester-Polyol F | MPD/TMP = (48.8) | AD | 2000 | 2.200 | not detected |
| Reference Example 7 | Polyester-Polyol G | MPD/TMP = (97.5) | Sb | 2500 | 2.100 | 35 |
| Reference Example 8 | Polyester-Polyol H | BD (–) | AD | 2000 | 2.000 | 77 |
| Reference Example 9 | Polyester-Polyol I | ND/TMP = (81.0) | AD | 2000 | 2.100 | 90 |

EXAMPLE 1

(1) The polyester-polyol obtained in Reference Example 2, a polyether-polyol of PTMG having a number-average molecular weight of 1500 and BD, which had been all heated to 80° C., and MDI which had been heated to 50° C.

at ratios shown in Table 2 below, were continuously fed into a twin-screw extruder (30 mm diameter, L/D=36) with two screws rotating in the same axial direction using a metering pump to subject the mixture to continuous melt polymerization so as to give a thermoplastic polyurethane with the temperature of the extruder cylinder being kept at 260° C. Subsequently, the melt of the resulting polyurethane was continuously extruded out through the die into water, then pelletized into thermoplastic polyurethane pellets. The resulting pellets were dried at 80° C. for 24 hours in vacuum.

(2) The dry pellets prepared in (1) were then fed into an ordinary spinning device equipped with a single-screw extruder, and melt-spun into monofilaments at a spinning temperature falling between 200 and 240° C. and at a spinning rate of 500 m/min. while being cooled with cold air at a dew point of 10° C., and the monofilaments were wound up around a bobbin. Thus were produced polyurethane elastic fibers (monofilaments) (40 denier). The spinning stability in the production process was checked according to the method mentioned above, and the results obtained are shown in Table 2 below.

(3) The polyurethane elastic fibers produced in (2) were aged at room temperature and at a relative humidity of 60% for 10 days.

(4) The logarithmic viscosity, the heat resistance, the hot water resistance, the degree of elastic recovery, the elongation and the homogeneousness of the polyurethane elastic fibers having been ripened in (3) were determined and evaluated according to the methods mentioned above. The results obtained are shown in Table 2 below.

EXAMPLES 2 TO 10

(1) Thermoplastic polyurethane pellets were prepared in the same manner as in Example 1 except that the polyester-polyols and the polyether-polyols shown in Table 2 were used and that the proportions of the polyester-polyol, the polyether-polyol, the chain extender and the organic diisocyanate to be combined were varied to those shown in Table 2. The resulting pellets were dried in vacuum also in the same manner as in Example 1.

(2) The thermoplastic polyurethane pellets prepared in (1) were melt-spun into polyurethane elastic fibers (monofilaments) in the same manner as in Example 1. The spinning stability of the pellets is shown in Table 2 below.

(3) Also in the same manner as in Example 1, the polyurethane elastic fibers produced in (2) were aged, and the logarithmic viscosity, the heat resistance, the hot water resistance, the degree of elastic recovery, the elongation and the homogeneousness of the thus-aged, polyurethane elastic fibers were determined and evaluated according to the methods mentioned above. The results obtained are shown in Table 2 below.

TABLE 2

| Example | Polyester-Polyol (moles) | | Polyether-Polyol (moles) | | Average Number of Functional Hydroxyl Groups | Organic Diisocyanate (moles) | Chain Extender (moles) | b/(a + c) |
|---|---|---|---|---|---|---|---|---|
| 1 | B | (0.5) | X | (0.5) | 2.05 | MDI 3.34 | BD 2.24 | 1.03 |
| 2 | C | (0.5) | X | (0.5) | 2.05 | MDI 4.86 | BD 3.72 | 1.03 |
| 3 | B | (0.5) | X | (0.5) | 2.05 | MDI 3.47 | BD 2.24 | 1.07 |
| 4 | G | (0.5) | X | (0.5) | 2.05 | MDI 3.34 | BD 2.24 | 1.03 |
| 5 | B | (0.2) | X | (0.8) | 2.02 | MDI 3.34 | BD 2.24 | 1.03 |
| 6 | B | (0.8) | X | (0.2) | 2.08 | MDI 3.34 | BD 2.24 | 1.03 |
| 7 | F | (0.1) | X | (0.9) | 2.02 | MDI 3.34 | BD 2.24 | 1.03 |
| 8 | B | (0.5) | X | (0.5) | 2.05 | MDI 3.27 | BD 2.24 | 1.01 |
| 9 | B | (0.5) | Y | (0.5) | 2.05 | MDI 3.84 | BD 2.73 | 1.03 |
| 10 | B | (0.5) | W | (0.5) | 2.05 | MDI 2.83 | BD 1.75 | 1.03 |

| Example | Spinning Stability | Logarithmic Viscosity [dl/g] | Heat Resistance (%) | Hot Water Resistance [%] | Degree of Elastic Recovery [%] | Elongation [%] | Homogeneousness |
|---|---|---|---|---|---|---|---|
| 1 | ○ | insoluble | 60 | 54 | 94 | 480 | ○ |
| 2 | ○ | insoluble | 62 | 55 | 94 | 490 | ○ |
| 3 | ○ | insoluble | 58 | 56 | 92 | 470 | ○ |
| 4 | ○ | insoluble | 62 | 60 | 91 | 460 | ○ |
| 5 | ○ | insoluble | 62 | 57 | 93 | 460 | ○ |
| 6 | ○ | insoluble | 64 | 52 | 91 | 470 | ○ |
| 7 | ○ | insoluble | 63 | 59 | 92 | 460 | ○ |
| 8 | ○ | insoluble | 57 | 52 | 92 | 490 | ○ |
| 9 | ○ | insoluble | 61 | 56 | 91 | 460 | ○ |
| 10 | ○ | insoluble | 58 | 53 | 91 | 460 | ○ |

W: Mitsubishi Chemical's PTMG 1000 (having a number-average molecular weight of 1000)
X: Mitsubishi Chemical's PTMG 1500 (having a number-average molecular weight of 1500)
Y: Mitsubishi Chemical's PTMG 2000 (having a number-average molecular weight of 2000)

COMPARATIVE EXAMPLES 1 TO 9

(1) Thermoplastic polyurethane pellets were prepared in the same manner as in Example 1 except that the polyester-polyols and the polyether-polyols shown in Table 3 were used and that the proportions of the polyester-polyol, the polyether-polyol, the chain extender and the organic diisocyanate to be combined were varied to those shown in Table 3. The resulting pellets were dried in vacuum also in the same manner as in Example 1.

(2) The thermoplastic polyurethane pellets prepared in (1) were melt-spun into polyurethane elastic fibers (monofilaments) in the same manner as in Example 1. The spinning stability of the pellets is shown in Table 3 below.

TABLE 3

| Comparative Example | Polyester-Polyol (moles) | | Polyether-Polyol (moles) | | Average Number of Functional Hydroxyl Groups | Organic Diisocyanate (moles) | Chain Extender (moles) | b/(a + c) |
|---|---|---|---|---|---|---|---|---|
| 1 | D | (0.5) | X | (0.5) | 2.05 | MDI 7.40 | BD 6.2 | 1.03 |
| 2 | B | (0.5) | X | (0.5) | 2.05 | MDI 3.21 | BD 2.2 | 0.99 |
| 3 | B | (0.5) | X | (0.5) | 2.05 | MDI 3.69 | BD 2.2 | 1.14 |
| 4 | H | (0.5) | X | (0.5) | 2.00 | MDI 3.34 | BD 2.2 | 1.03 |
| 5 | I | (0.5) | X | (0.5) | 2.05 | MDI 3.34 | BD 2.2 | 1.03 |
| 6 | F | (0.8) | X | (0.2) | 2.16 | MDI 3.34 | BD 2.2 | 1.03 |
| 7 | E | (0.5) | X | (0.5) | 2.00 | MDI 3.34 | BD 2.2 | 1.03 |

TABLE 3-continued

| Ex-am-ple | Spin-ning Stability | | | | Loga-rithmic Vis-cosity [dl/g] | Heat Resis-tance (%) | Hot Water Resis-tance [%] | Degree of Elastic Re-covery [%] | Elon-gation [%] | Homog-eneous-ness |
|---|---|---|---|---|---|---|---|---|---|---|
| 8 | B | (0.5) | Z | (0.5) | 2.05 | MDI 3.34 | BD 2.2 | 1.03 | | |
| 9 | B | (1.0) | — | (0.0) | 2.05 | MDI 2.12 | BD 1.1 | 1.03 | | |
| 1 | Δ | | | | in-soluble | 61 | 55 | 95 | 500 | Δ |
| 2 | ○ | | | | 1.15 soluble | 27 | 30 | 93 | 490 | ○ |
| 3 | X | | | | in-soluble | 40 | 46 | 88 | 350 | X |
| 4 | ○ | | | | 1.25 soluble | 31 | 30 | 85 | 420 | ○ |
| 5 | ○ | | | | in-soluble | 60 | 56 | 82 | 410 | ○ |
| 6 | X | | | | in-soluble | 60 | 50 | 86 | 450 | X |
| 7 | ○ | | | | 1.25 soluble | 33 | 45 | 95 | 450 | ○ |
| 8 | X | | | | in-soluble | 61 | 57 | 85 | 300 | X |
| 9 | ○ | | | | in-soluble | 40 | 47 | 94 | 480 | ○ |

X: Mitsubishi Chemical's PTMG 1500 (having a number-average molecular weight of 1500)
Y: Mitsubishi Chemical's PTMG 2000 (having a number-average molecular weight of 2000)
z: Mitsubishi Chemical's PTMG 3000 (having a number-average molecular weight of 3000)

(3) Also in the same manner as in Example 1, the polyurethane elastic fibers produced in (2) were ripened, and the logarithmic viscosity, the heat resistance, the hot water resistance, the elastic recovery, the elongation and the homogeneousness of the thus-aged, resilient polyurethane fibers were determined and evaluated according to the methods mentioned above. The results obtained are shown in Table 3.

As in Table 2, the thermoplastic polyurethanes and the polyurethane elastic fibers that satisfy the requirements of the invention have good properties of spinning stability, heat resistance, hot water resistance, degree of elastic recovery, elongation and homogeneousness.

As opposed to those of the polyurethane elastic fibers of Examples 1 to 10, Table 3 reveals poor spinning stability and homogeneousness of the polyurethane elastic fibers of Comparative Example 1, in which the polyester-polyol D used had a large number-average molecular weight; poor heat resistance and hot water resistance of the polyurethane elastic fibers of Comparative Example 2, in which the number of moles, b, of the organic diisocyanate used was small; and poor properties of the resilient polyurethane fibers of Comparative Example 3, in which the number of moles, b, of the organic diisocyanate used was large. In addition, Table 3 also reveals poor heat resistance, hot water resistance, degree of elastic recovery and elongation of the polyurethane elastic fibers of Comparative Example 4, in which the polyester-polyol H used had a large crystallization enthalpy (ΔH) and in which the average number of moles of functional hydroxyl groups in the polyol composition used was small; poor degree of elastic recovery and elongation of the polyurethane elastic fibers of Comparative Example 5, in which the polyester-polyol I used had a large ΔH; and poor hot water resistance, degree of elastic recovery and homogeneousness of the polyurethane elastic fibers of Comparative Example 6, in which the average number of functional hydroxyl groups in the polyol composition used was large. Further, Table 3 reveals poor heat resistance and hot water resistance of the resilient polyurethane fibers of Comparative Example 7, in which the average number of functional hydroxyl groups in the polyol composition used was small; poor spinning stability and homogeneousness of the polyurethane elastic fibers of Comparative Example 8, in which the polyether-polyol Z used had a large number-average molecular weight; and poor heat resistance and hot water resistance of the polyurethane elastic fibers of Comparative Example 9, in which the polyether-polyol (A-2) was not used.

While the invention has been described in detail and with reference to specific embodiments thereof, it will be apparent to one skilled in the art that various changes and modifications can be made therein without departing from the spirit and scope thereof.

What is claimed is:

1. A thermoplastic polyurethane obtained by reacting;
   [1] a polyol composition (A) which consists essentially of a polyester-polyol (A-1) having a crystallization enthalpy of at most 70 J/g and a number-average molecular weight of from 1000 to 5000 and a polyether-polyol (A-2) having a number-average molecular weight of from 500 to 2500, and in which the average number, f, of the functional hydroxyl groups existing therein and represented by the following formula (I):

f={number of all hydroxyl groups in the polyols constituting the polyol composition}/{number of molecules of all polyols constituting the polyol composition}  (I), falls between 2.006 and 2.100,
   [2] an organic diisocyanate (B), and
   [3] a chain extender (C),
   at a ratio that satisfies the following formula (II):

$$1.00 \leq b/(a+c) \leq 1.10 \quad (II)$$

wherein a indicates the number of moles of all polyols constituting the polyol composition (A), b indicates the number of moles of the organic diisocyanate (B), and c indicates the number of moles of the chain extender (C).

2. The thermoplastic polyurethane as claimed in claim 1, wherein the molar ratio of the polyester-polyol (A-1) to the polyether-polyol (A-2) is between 5/95 and 95/5.

3. Polyurethane elastic fibers comprising the thermoplastic polyurethane of claim 1.

4. A method for producing polyurethane elastic fibers, which comprises melt-spinning a thermoplastic polyurethane obtained by reacting;
   [1] a polyol composition (A) which consists essentially of a polyester-polyol (A-1) having a crystallization enthalpy of at most 70 J/g and a number-average molecular weight of from 1000 to 5000 and a polyether-polyol (A-2) having a number-average molecular weight of from 500 to 2500, and in which the average number, f, of the functional hydroxyl groups existing therein and represented by the following formula (I):

f={number of all hydroxyl groups in the polyols constituting the polyol composition}/{number of molecules of all polyols constituting the polyol composition}  (I), falls between 2.006 and 2.100,
   [2] an organic diisocyanate (B), and
   [3] a chain extender (C),
   at a ratio that satisfies the following formula (II):

$$1.00 \leq b/(a+c) \leq 1.10 \quad \quad (II)$$

wherein a indicates the number of moles of all polyols constituting the polyol composition (A), b indicates the number of moles of the organic diisocyanate (B), and c indicates the number of moles of the chain extender (C), or comprises melt-spinning the thermoplastic polyurethane while forming it by reacting the polyol composition (A), the organic diisocyanate (B) and the chain extender (C) in the predetermined ratio satisfying the formula (II).

* * * * *